Patented Aug. 9, 1932

1,870,383

UNITED STATES PATENT OFFICE

GEORGE ETHELBERT SANDERS, OF NEW YORK, N. Y.

DUSTING POWDER AND METHOD OF MANUFACTURING SAME

No Drawing.   Application filed March 30, 1927.   Serial No. 179,712.

This invention relates to a dry dusting powder adapted for use as a fungicide, a disinfectant, or an insecticide.

It has been proposed to use various compounds and derivatives of cresylic acid in the form of liquid spray, paint or wash as a disinfectant or insecticide but the operation of spraying has many disadvantages as compared with dusting in that it takes more labor and time and is not so well adapted to either hilly or muddy ground.

The object of the present invention is a dry dusting powder which will allow the ingredients to be applied to the foliage of trees with the superior speed, ease and economy of dusting as compared with spraying. The dusting powder to act in the preventing of certain fungus diseases, as a repellent in preventing certain insects from destroying the foliage, as an insecticide in killing certain insects and a disinfectant in destroying certain bacteria.

A further object of the invention is the provision of a method of forming a dry dusting powder consisting substantially of lime and cresol or the cresol bearing distillate from a tar or tar like substance. The end product consisting partly of calcium cresylate in dry powdered form.

The proportion of cresylic acid used may be varied to suit the resistance of the plant to be treated and the resistance of the insect or disease to be combatted.

Since it is now well established that the application of a fungicide or insecticide in the form of powder possesses numerous advantages over spraying or washing, I have provided a method and product of forming such a dust by combining cresol or the cresol bearing distillate from a tar or tar like substance with a vehicle to form a dry dusting powder which may be used to reach such parts adapted to be treated and where it is more desirable to dust than to spray.

Hereinafter I shall refer to what is known commercially as cresylic acid or the cresol bearing distillate from a tar or tar like substance as cresylic acid.

In carrying out my invention, I prefer to form a portion of the cresol into calcium cresylate in the following economical manner, by reacting the cresylic acid or the cresol bearing distillate from a tar or tar like substance with the hydrated lime in the presence of a relatively inert fluffer or powder which does not in itself react appreciably with the cresylic acid, the powder being added in order to make the mass friable and easily broken up. Such inert or semi-inert powders as infusorial earth, tobacco dust, talc or fuller's earth may be used. The cresylic acid may be added to the fluffer or relatively inert powder before it is mixed with the hydrated lime or it may be mixed with the hydrated lime after the hydrated lime has been mixed with the fluffer or relatively inert powder, the object being to have the reaction between the lime and the cresylic acid take place in the presence of the fluffer or relatively inert powder in order that the final product may be friable and easily blown through a dusting machine and spread lightly and evenly over the object to be treated.

The product may be used directly after the reaction has taken place or it may be milled before using, the milling being done either immediately after the three ingredients, the cresol, the lime and the inert powder have been mixed or after the reaction between the lime and cresylic acid has taken place. The amount of milling necessary depends entirely on the quality of product desired and the use for which it is intended.

I prefer to confine this dust in a tight container while the combination is taking place but this is not absolutely necessary.

It is possible to partially substitute air slaked lime or calcium carbonate for the hydrated lime and mix with it the cresylic acid in the manner described and the end product be substantially the same, the cresol largely in the form of calcium cresylate.

The lime used in practicing this invention may be either pure calcium hydroxide or it may contain various impurities such as magnesium, iron, alumina silicon, copper, arsenic, sulphur, etc., without departing from the spirit of the invention.

The cresol containing powder may be mixed or used in combination with various insecticides, fungicides, repellents, or disinfectants without departing from the spirit of the invention. The cresol containing powder may be either the primary or secondary insecticide, fungicide, repellent or disinfectant. For instance, a mixture of infusorial earth and cresylic acid may be added to a copper lime arsenic dust consisting of hydrated lime, monohydrated copper sulphate and calcium arsenate. The resulting calcium cresylate thus formed will be most essential as a repellent to certain insects not controlled by the arsenic. As another instance, calcium cresylate dust might be added to a mixture of sulphur and lead arsenate for the same purpose. Again the calcium cresylate dust may be used directly and alone as a repellent and fungicide or any fungicide or insecticide may be added to it in order to increase its value without danger of plant injury. For instance, the percentage of cresol in the dust may be close to the margin of safety on foliage but still not quite strong enough to control the disease to be combatted. The addition of a copper compound would not increase the danger of foliage injury but would increase the value of the dust in the control of the fungus. The same holds true of its addition to compounds of sulphur, arsenic, nicotine, etc., or the reverse may be the case.

For the purpose of economy and efficiency I prefer to use a grade of commercial cresylic acid which is substantially cresylic acid or the cresol bearing distillate of a tar or tar like substance but other grade of cresylic acid may be used.

I prefer to use infusorial earth as the fluffer on account of its ability to absorb liquids to a great extent and still remain a powder and on account of a portion of it mixed with hydrated lime improving the dusting and flowing properties of hydrated lime. Other dry powders such as clays, talc, tobacco dust, fuller's earth, etc., however may be used as the fluffer without departing from the spirit of the invention.

It is possible to form calcium cresylate by reacting cresol or cresylic acid with almost any form of lime such as calcium oxide, calcium carbonate or calcium hydroxide and the end product be satisfactory or other salts of metals of the earth alkali group, in which I mean to include calcium, strontium, barium, magnesium, etc., may be substituted to form barium cresylate, magnesium cresylate, etc., without departing from the spirit of the invention. The inert fluffer or powder is used merely to attain a finely divided powder containing the required amount of cresol compounds with greater ease and economy.

Various liberators or adhesives or coaters to prevent or retard liberation of the cresylic acid may be added for various special purposes without departing from the spirit of the invention.

I claim:

A process of forming a dry dusting powder containing calcium cresylate which comprises absorbing cresylic acid on infusorial earth and then mixing with hydrated lime, the infusorial earth acting as a fluffer and preventing the cresylic acid and hydrated lime from forming a cake when combining and forming calcium cresylate.

Signed at New York, in the county of New York and State of New York, this twenty-ninth day of March, A. D. 1927.

GEORGE ETHELBERT SANDERS.